United States Patent Office 3,248,375
Patented Apr. 26, 1966

3,248,375
ETHYLENE/VINYL CHLORIDE COPOLYMERIZATION USING TRIETHYLBORANE AND OXYGEN AS COCATALYSTS AT HIGH PRESSURE
Lowell E. Erbaugh, Vandalia, Ohio, assignor to Monsanto Company, a corporation of Delaware
No Drawing. Filed June 10, 1959, Ser. No. 819,249
1 Claim. (Cl. 260—87.5)

The present invention is directed to the interpolymerization of ethylene and vinyl chloride with hydrides of boron and hydrocarbon derivatives of boron in the presence of oxygen catalyst. The invention is particularly directed to the low temperature polymerization of ethylene and vinyl chloride with hydrides of boron and hydrocarbon derivatives of boron in the presence of oxygen catalyst.

Methods of interpolymerizing ethylene and vinyl chloride have been known heretofore. However, in general the catalyst systems employed in such interpolymerizations required the use of relatively high temperatures for mass polymerization, and therefore caused substantial decomposition of the vinyl chloride monomer. The catalyst system employed herein is therefore especially valuable in the interpolymerization of ethylene and vinyl chloride, as it permits the use of relatively low temperatures such as temperatures below 70° or the like.

In one particular aspect the present invention involves the control of the rate of polymerization of the ethylene and vinyl chloride by regulating the rate of addition of oxygen catalyst.

The ethylene/vinyl chloride copolymer produced according to the present invention is a clear polymeric material having good chemical resistance and, in general, rubbery properties, depending upon the ratio of ethylene to vinyl chloride. The ethylene to vinyl chloride ratio can vary considerably, but ordinarily will be in the range of about 25 to 95 parts ethylene to 5 to 85 parts vinyl chloride, all parts being by weight, although greater or smaller parts of either monomer can be employed. However, in general the most useful rubbery properties will probably be obtained by using 20 to 60 parts vinyl chloride for 100 parts of polymer, the parts being by weight. In one important aspect of the invention, the oxygen is introduced into the reactor containing a boron hydride or boron hydrocarbon catalyst, vinyl chloride, and ethylene under high pressure, the reaction being controlled and the efficiency of the catalyst being improved by this procedure. In addition, it is convenient to be able to add the catalyst components separately and have the catalyst formed in situ, thus avoiding the problem of handling and preserving the activity of an unstable catalyst. Moreover, the continued addition of oxygen is effective in maintaining a catalyst of uniform activity throughout the reaction period.

The polymerization procedure of the present invention has number of other important advantages. The polymerization can be initiated and carried out at low temperatures, e.g., those not over about 70° C. or so and very good results are obtained below 50° C., even at 0° C. or much lower temperatures; as vinyl chloride is subject to decomposition upon heating, as noted above, the use of such low polymerization temperatures has great advantage in the interpolymerization of ethylene and vinyl chloride. An additional feature is the fact that no difficulty removable catalyst residues are formed in the polymerization and acceptable ethylene/vinyl chloride copolymer can be readily isolated from the polymerization mixture. Moreover, in the case of tubular reactors, the feasibility of adding the oxygen catalyst separately has advantages in avoiding undesirable deposits in the inlet end of the reactor, i.e., in maintaining "front end" reactor cleanliness.

It will be understood that the reaction can be controlled by an alternative method involving the use of small amounts of boron catalyst compound, particularly in the case of hydrocarbon boron catalyst, in combinations with the oxygen, the amount being so small that the heat of reaction can be readily dissipated as the low concentration of boron compound catalyst prevents the simultaneous reaction of large amounts of ethylene and vinyl chloride; however, aside from possibly undesirably low reaction rates and other difficulties, it would then be necessary to add additional increments of boron catalyst compound as the reaction proceeded toward completion. A much more preferable method of control is to effectively regulate the concentration of the active catalyst by keeping the concentration of oxygen dilute at all times, in particular by adding the oxygen in small, regulated amounts and only when high concentrations of monomer are present, for example, a high concentration of ethylene as indicated by a pressure of more than 10,000 p.s.i.; however, the procedure of adding the boron catalyst compound to the mixture of monomers in oxygen can also be employed.

As the boron catalyst components employed in the present invention completely inorganic hydrides of boron containing only hydrogen and boron atoms are included, as well as hydrocarbon derivatives of boron and boron hydrides, such as alkyl borons, cycloalkyl borons, aryl borons, alkyl borohydrides, cycloalkyl borohydrides, aryl borohydrides, and the like. As trialkyl borons which can be employed in the present invention, any trialkyl boron is contemplated as applicable, particularly in which the alkyl groups have 1 to 10 or more carbon atoms and have a normal or forked chain, or cyclic structures. While trialkylboranes in which all of the alkyl groups are the same will ordinarily be employed for convenience, those containing 2 or 3 different alkyls are also siutable, as are mixtures of 2 or more different trialkylboranes. A few of the specific alkylboranes which are suitable are, for example, triethylborane, trimethylborane, tri-n-propylboranes, triisopropylborane, triisobutylborane, tri-n-butylborane, tri-n-hexylborane, tri-n-butylborane, tri-n-hexylborane, tri-n-octylborane, butyldiethylborane, tricyclohexylborane, tridecylborane and the like. Examples of arylboranes include triphenylborane, tritolylborane, tri-p-xylylborane, trinaphthylborane and the like. As completely inorganic hydrides useful as a boron hydride in the present invention, representative relatively stable compounds are diborane ($B_2H_6$), pentaborane ($B_5H_9$), hexylborane ($B_6H_{10}$), and decaborane ($B_{10}H_{14}$), but other less stable hydrides of boron such as $BH_3$, $B_4H_{10}$, $B_5H_{11}$, and $B_6H_{12}$ which readily decompose to various polymeric hydrides of boron can also be employed, as can various homologues and analogs of the foregoing, particularly those having from 1 to 10 or so boron atoms.

Mixtures of the hydrides of boron and the hydrocarbon derivatives of boron can be employed as a catalyst component in the present invention. Moreover, mixed hydride-hydrocarbon derivatives of boron can be employed as represented, for example, by any of the foregoing hydrides of boron in which at least one but not all of the hydrogens have been replaced by hydrocarbon groups, for example, by aryl or alkyl groups such as phenyl or methyl groups, or by ony of the other groups set forth above in the examples of hydrocarbon derivatives of boron. A few such representative boron hydrides which are suitable, are, for example, diethylhydroborane, dihydroethylborane, dihydromethylborane, dimethyldiborane, ethyldiborane, dihydro-n-propylborane, dihydroisopropylborane, butyldihydroborane, dioctylhydroborane, dihydrophenylborane, as well as other alkyl, cycloalkyl, aryl, etc. hydroboranes. It may well be that alkylthydroboranes are produced in situ in the reaction of olefinic monomers with the boron hydride, BxHy, as for example when $B_2H_6$ is contacted with ethylene and vinyl chloride in the present process in the presence of oxygen and the use of such alkylhydroboranes is contemplated as within the invention whether added as such or produced in situ.

One particular group of the boron catalyst components suitable for use in the present invention can be presented by the formula:

$$BR_3$$

in which R represents hydrogen, alkyl, aryl, or cycloalkyl, and the individual R's can be the same or different.

The oxygen catalyst component employed in the present invention will generally be free oxygen, oxygen in air, or oxygen in admixture with other gases or with ethylene; however, it is possible and sometimes advantageous to employ other oxygen containing or oxygen generating compounds as catalyst adjuvants. The oxygen or peroxygen compounds suitable as oxygen component of the initiator employed in the present invention are, for example, oxygen, either added as such or generated in situ by addition of oxygen generating compounds, and including oxygen added as a component of gases such as air, and peroxygen compounds, particularly organic peroxygen compounds, capable of generating free radicals when heated below 200° C. such as hydrogen peroxide, dicumylperoxide, benzoylperoxide, laurylperoxide, diethylperoxide, ditertiarybutylperoxide, diisopropylperoxide, hydroxymethylperoxide, tertiarybutylhydroperoxide, ethylhydroperoxide, acetyl peracid, benzo peracid, succinic mono peracid, phthalic peracid, trimethylaceto peracid, ethylpercaproate, ethylperbenzoate, tertiarybutylperbenzoate, etc. and any other peroxide or peroxygen compounds capable of employment as free radical polymerization catalysts. While the description herein will be primarily directed to the use of oxygen itself as a catalyst component, it will be realized that the description is pertinent to the oxygen catalyst adjuvants in general, it only being necessary for the most part to substitute equimolar amounts of organic or other peroxygen compound for oxygen in any procedure.

It will be realized that the hydrides of boron or hydrocarbon derivatives of boron employed in combination with oxygen or peroxygen compounds are effective initiators for interpolymerization of ethylene and vinyl chloride without the necessity for any other metal salts or compounds and that the presence of other metal salts such as $TiCl_4$ and the like while permissible, is not required and in some cases might even be deleterious to the free radical catalyzed polymerization; i.e., in one preferred embodiment it is contemplated that a hydride of boron or hydrocarbon derivative of boron be the sole metal compound employed in the polymerization.

The polymerization according to the present invention can be effected at relatively low polymerization temperatures, such as room temperature and the like, thereby avoiding the necessity of heating the reactants and causing some decomposition thereof, particularly of vinyl chloride, with deleterious affect upon the properties of the resulting polymer—particularly upon the clarity of the polymers. Thus, the polymerization can be effected at temperatures of about —100° C. to 100° C., generally below 70° C., to produce polymers characterized by properties resulting from low temperature polymerization, temperatures of about 0° C. to 50° C. being particularly suitable. Controlling the temperatures also provides a method of controlling density to some extent, as the density of the polymer produced bears an inverse relationship to polymerization temperature. If desired, however, the polymerizations of the present invention can be effected at somewhat higher temperatures, but the resulting polymer will be contaminated to some extent by decomposition products. In one of its aspects the present invention can be considered as a method of effecting a low temperature, oxygen-catalyzed interpolymerization of ethylene and vinyl chloride. Under ordinary conditions in the absence of solvents or aqueous emulsifying media, oxygen will not cause substantial initiation of interpolymerization of ethylene and vinyl chloride except at temperatures of above about 150° C. The present invention by the use of both a boron hydride or hydrocarbon boron catalyst component and oxygen provides a method of carrying out the mass copolymerization at much lower temperatures, for example, having substantially the entire polymerization occur below about 100° C., or even below about 50° C., and obtaining high molecular weight ethylene/vinyl chloride copolymer.

Regulating the rate of addition of the oxygen is an effective control method. Thus, in the presence of sufficient amounts of boron hydride or hydrocarbon derivatives of boron catalyst to effect the rapid, uncontrolled polymerization of the ethylene if uncontrolled amounts of oxygen were immediately added, it is possible to so control the oxygen addition as to effect an efficient, reasonably rapid conversion of the ethylene and vinyl chloride to high molecular weight copolymer, without having so much oxygen as to make it impossible to dissipate the heat of the exothermic polymerization thereby causing undue rises in the reaction temperature and resulting deterioration or carbonization of the product. For example, the oxygen can be added at rates sufficient to avoid temperature in excess of 100° C. for any substantial part of the polymerization cycle. The controlled addition of the oxygen will be especially advantageous when relatively high amounts of the boron component are employed, although the effectiveness of heat transfer systems and other factors will have a considerable influence upon the advantage of carefully controlled oxygen addition. The regulated addition of oxygen will also provide a method of effecting good control of polymerization temperature, making it possible to conduct almost the entire polymerization within a certain range of a particular temperature, for example, 0° C., with consequent uniformity of product.

While the regulated addition of oxygen is a preferred control procedure, it is also possible to effect control of the polymerization by regulated addition of the boron hydride or hydrocarbon derivative of boron component to a mixture of ethylene, vinyl chloride and oxygen.

With the present method of controlling and effecting the polymerization, it is not necessary to employ a chain transfer agent, such as an alkane of 3 to 6 carbon atoms or the like, to control the polymerization, but use of such agents may have certain advantages, particularly at lower temperatures, and their use will be discussed more fully hereinbelow.

The polymerization according to the present invention can occur in bulk, in aqueous or non-aqueous emulsion, or in solution in hydrocarbon or other organic solvents and the like, it can also occur in gaseous or vapor phase. It is especially notable in the case of bulk polymerization that the interpolymerization according to the present invention can be effected at low temperature.

It is generally advantageous in the present invention to have at least about one half of the total amount of oxygen catalyst employed added after the pressure has been raised to 10,000 p.s.i. or greater, and preferably at least about three fourths of the oxygen catalyst added after such pressures have been attained.

The amount of boron hydride or hydrocarbon derivatives of boron catalyst can vary considerably, for example from less than 0.0001% up to 2% or more by weight of the polymerizable monomers, the amounts within these ranges being so chosen that the polymerization will proceed at acceptable rates, and also so that the polymerization can be controlled under the conditions and with the apparatus employed. In general, the hydrocarbon derivatives of boron are less reactive than the hydrides of boron, and the hydrocarbon derivatives will ordinarily be employed in amounts from less than about 0.1% to 2% by weight of the polymerizable monomers, but higher amonuts up to 5% or more can be employed. The oxygen catalyst component will generally be added in percentages similar to the particular boron compound components, and will also be added in amounts or at a rate such that these polymerization proceeds at the desired rate for example, in the case of the hydrocarbon derivatives of boron, such as trialkylboranes, oxygen or peroxygen cataylst are suitably employed in amounts which are approximately equimolar, although smaller amounts from a trace of oxygen upward are effective to some extent but conversion rates are undesirably slow; amounts of oxygen in the range of 0.5 to 1.5 moles of hydrocarbon derivatives of boron, such as trialkylboranes, will ordinarily be very suitable.

The total amounts of oxygen or peroxygen catalysts compound employed in the process can vary considerably; for example, the total amount of oxygen will often be in the range from about less than 1 part by weight to 50 or so parts by weight, based on a million parts by weight of polymerizable monomers, the actual amount depending to a considerable extent upon the type and amount of boron catalyst component employed. With the hydrocarbon derivatives of boron as the boron catalyst component, the total amounts of oxygen will generally be in the range from about 5 parts by weight to 50 or so parts by weight, based on a million parts by weight of polymerizable monomers; when effecting an interpolymerization with this catalyst system, it is desirable that the ethylene originally charged contain less than 5 weight parts per million of oxygen.

The invention is illustrated by the following examples in which triethylborane is employed as an exemplification of hydrocarbon derivatives of boron and boron hydrides.

*Example 1*

A 250 cc. jacketed autoclave was flushed with nitrogen, charged with about 0.1 cc. triethylborane, 50 grams vinyl chloride, and pressured to 25,000 p.s.i., with ethylene, while the jacket temperature was maintained at 30° C. When the pressure had reached 24,000 p.s.i., oxygen was added along with the ethylene, a total of 0.027 gram oxygen being added. There was substantially no temperature rise with the oxygen addition, and the internal temperature remained at approximately 30° C. during the polymerization. A number of hours after the oxygen addition, the reactor was opened and the solid, ethylene/vinyl chloride copolymer containing about 25 parts by weight vinyl chloride to 75 parts by weight ethylene (by charge ratio) was removed. The ethylene/vinyl chloride copolymer was cured with dicumyl peroxide (about 3% by weight of the copolymer) at 302° F. for 45 minutes in a closed mold to give a crystal-clear molding. The rubbery copolymer had properties as follows:

|  | Raw | Cured |
| --- | --- | --- |
| 500% modulus (p.s.i.) | 145 | 670 |
| Tensile strength at break (p.s.i.) | 680 | 1,035 |
| Elongation at break (percent) | 2,100 | 700 |

The rubbery copolymer had substantially no permanent set by ordinary methods of measurement, in either the raw or cured state. The ethylene/vinyl chloride copolymer has high chemical resistance, particularly to such acids as sulfuric acid, and is particularly suited for use, either alone or in admixture with other rubbers, in specialized rubber applications in which high resistance to chemicals, oxidation and the like is of importance.

*Example 2*

A 250 cc. reactor was charged with 0.2 cc. triethylborane and 100 grams vinyl chloride and the reactor was pressured to 25,000 p.s.i. with about 108 grams ethylene. A small amount of oxygen was injected in the ethylene inlet stream starting when the pressure was 23,000 p.s.i. The reactor was opened after standing the better part of a day at 30° C., and 33 grams ethylene/vinyl chloride copolymer was removed. The crystal-clear copolymer, prepared from ethylene and vinyl chloride charged in approximate ratio of 52 parts ethylene to 48 parts vinyl chloride, the parts being by weight, had properties as follows:

| | |
| --- | --- |
| 500% modulus (p.s.i.) | 1325 |
| Tensile strength at break (p.s.i.) | 1400 |
| Elongation at break (percent) | 520 |

The rubbery copolymer had substantially no permanent set and had good chemical resistance. The clarity of the copolymer indicates that very little decomposition of the vinyl chloride occurred during the polymerization, thus demonstrating the advantage of low temperature polymerization for ethylene/vinyl chloride.

While pressures around 25,000 p.s.i. are very suitable for use in the present invention, other pressures, particularly super-atmospheric pressures are also suitable, for example, from 5000 to 50,000 p.s.i., particularly pressures from 10,000 to 50,000 p.s.i., or even up to 100,000 or 200,000 p.s.i. or greater can be employed effectively.

While the present invention is particularly concerned with copolymerization of ethylene and vinyl chloride, it is also contemplated to utilize small amounts of copolymerizable monomers along with the ethylene and vinyl chloride in preparing interpolymers of ethylene and vinyl chloride according to the present invention while the foregoing illustrations are in the main concern with batch polymerization, is possible to conduct similar continuous polymerization in similar reactors or in highly elongated tubes, i.e., tubular reactors by making suitable modification as necessary. In the continuous polymerization, the present invention can be employed in tubular reactors along with the flow impulse feature, chain transfer agents and conditions described in the copending application of John D. Calfee, William R. Richard, Jr., Wallace G. Bir and Norval E. Jones, S.N. 712,339, filed on January 31, 1958, and with similar features in U.S. Patent 2,852,501 to William R. Richard, Jr., Robert K. Stewart, and John D. Calfee, assignors to Monsanto Chemical Company, issued September 16, 1958, and the present invention could also be employed in conjunction with the oxygen catalyst compositions described in copending application S.N. 797,350, of Oliver De S. Deex, Lowell E. Erbaugh, and John M. Butler. When employing continuous procedures it will be desirable to have sufficient hydride of boron or hydrocarbon derivative of boron present and to add oxygen at a rate sufficient to affect 10 to 20% by weight conversion of ethylene and vinyl chloride to ethylene/vinyl chloride interpolymer per minute.

The interpolymers formed according to the present invention will be useful in coating, insulating, and molding applications, and in general in applications for which rubber are suited, particularly in those applications requiring high chemical resistance.

I claim:

The method of conducting a mass interpolymerization of ethylene and vinyl chloride to obtain clear ethylene/vinyl chloride interpolymer which comprises contacting ethylene, vinyl chloride and triethylborane under pressure and injecting oxygen into the contacted materials when the reactants are under a pressure of at least 10,000 p.s.i. and permitting polymerization at temperatures below about 100° C.

(References on following page)

References Cited by the Examiner

UNITED STATES PATENTS

| | | | |
|---|---|---|---|
| 2,388,178 | 10/1945 | Peterson | 260—87.5 |
| 2,422,392 | 6/1947 | Brubaker et al. | 260—87.5 |
| 2,683,141 | 7/1954 | Erchak | 260—94.9 |
| 2,685,575 | 8/1954 | Heiligmann et al. | 260—83.7 |
| 2,840,551 | 6/1958 | Field et al. | 260—93.5 |
| 2,985,633 | 5/1961 | Welch | 260—85.3 |

OTHER REFERENCES

Furukawa et al., Journal of Polymer Science, 28, No. 116 (1958), pp. 227–229.

JOSEPH L. SCHOFER, *Primary Examiner.*

MILTON STERMAN, HAROLD N. BURSTEIN, JOSEPH R. LIEBERMAN, WILLIAM H. SHORT, *Examiners.*